July 14, 1936.  R. F. LEFTWICH  2,047,375
METHOD AND MEANS OF DISPOSAL OF REFUSE
Filed May 17, 1932  8 Sheets-Sheet 1

INVENTOR
Robert F. Leftwich
BY
Cooper, Kerr & Dunham
ATTORNEYS

July 14, 1936.  R. F. LEFTWICH  2,047,375
METHOD AND MEANS OF DISPOSAL OF REFUSE
Filed May 17, 1932  8 Sheets-Sheet 3

INVENTOR
Robert F. Leftwich
BY
Cooper, Kerr & Dunham
ATTORNEYS

July 14, 1936. R. F. LEFTWICH 2,047,375
METHOD AND MEANS OF DISPOSAL OF REFUSE
Filed May 17, 1932 8 Sheets-Sheet 4
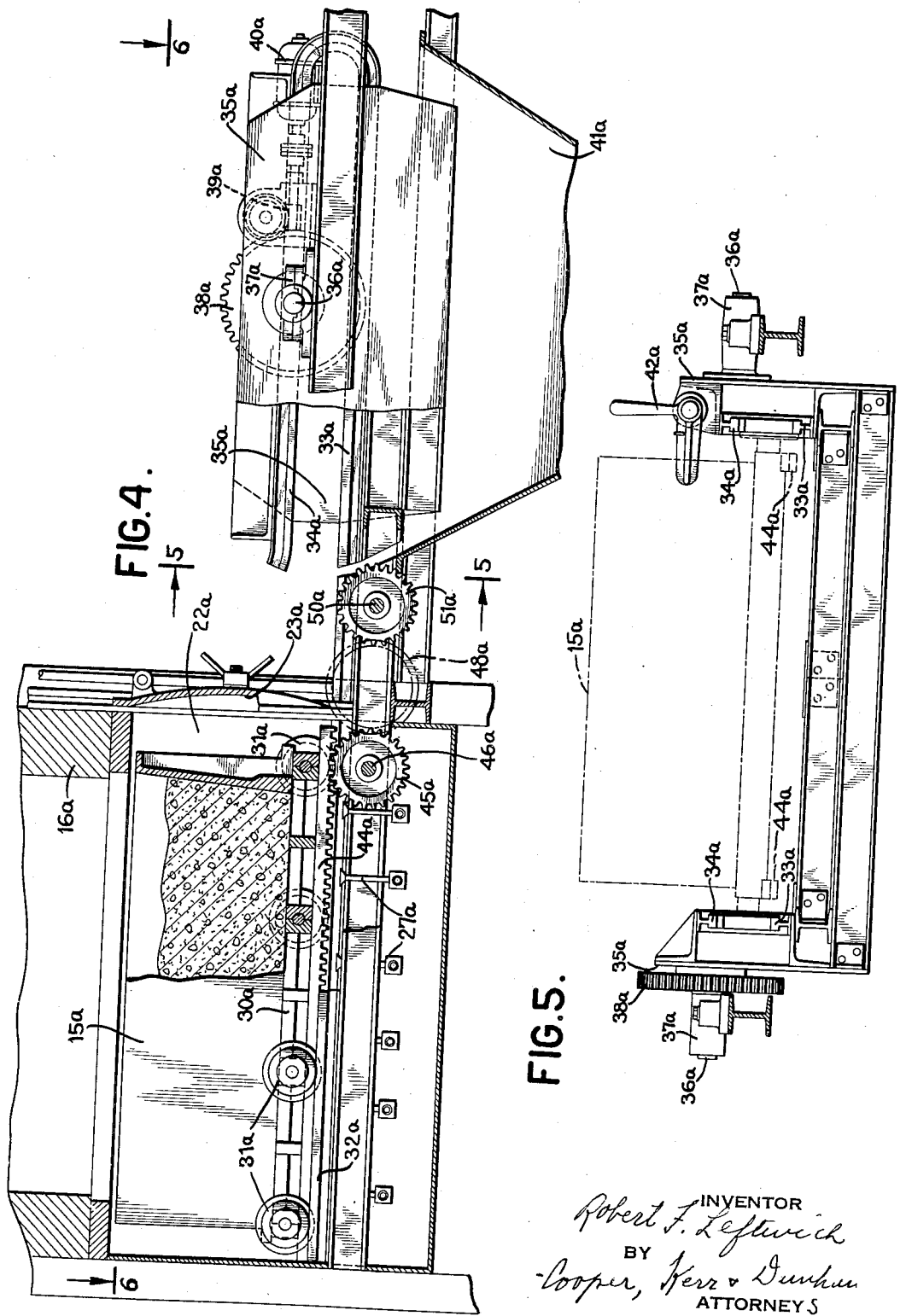

July 14, 1936.  R. F. LEFTWICH  2,047,375
METHOD AND MEANS OF DISPOSAL OF REFUSE
Filed May 17, 1932  8 Sheets-Sheet 5

INVENTOR
Robert F. Leftwich
BY
Cooper, Kerr & Dunham
ATTORNEYS

July 14, 1936.  R. F. LEFTWICH  2,047,375
METHOD AND MEANS OF DISPOSAL OF REFUSE
Filed May 17, 1932  8 Sheets-Sheet 6
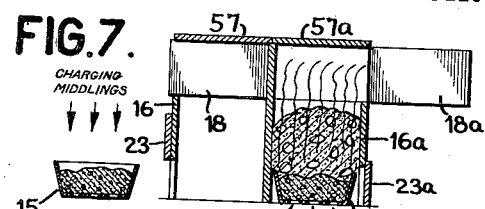
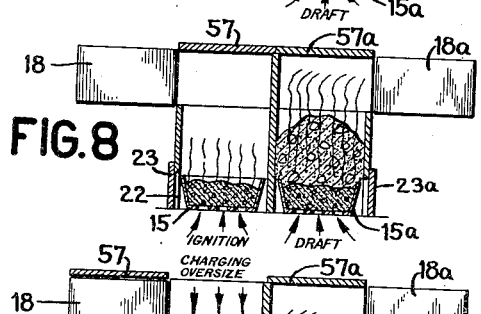
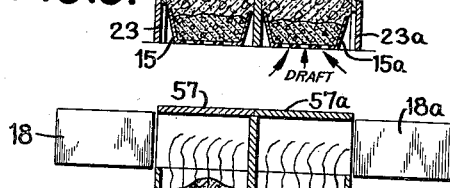
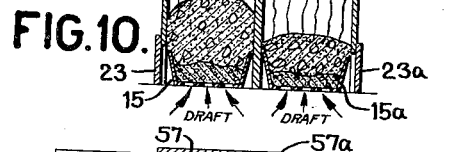
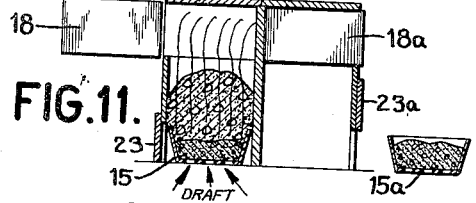
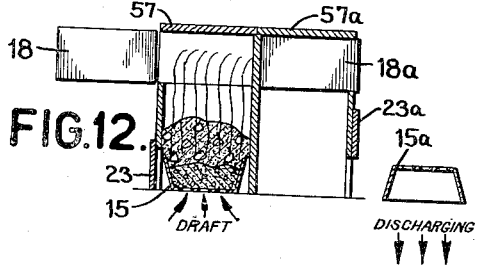
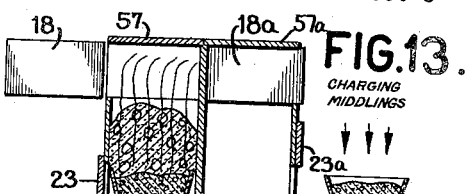
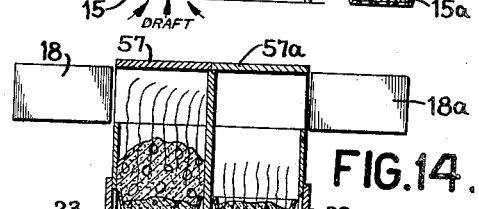
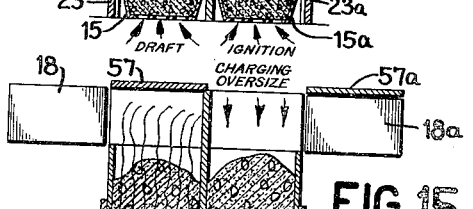
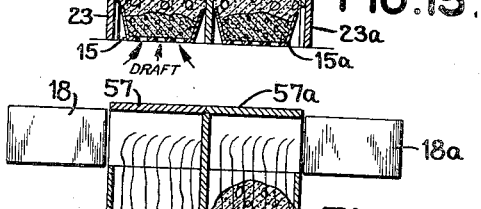
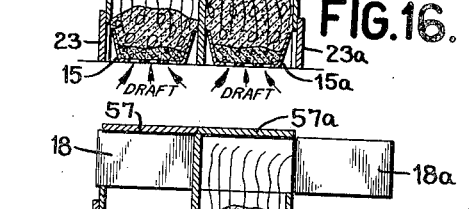
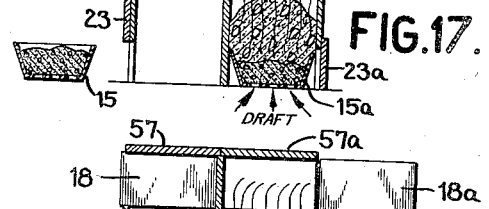
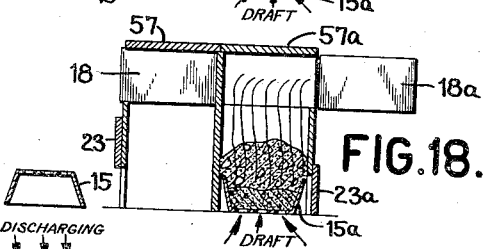
INVENTOR
Robert F. Leftwich
BY
Cooper, Kerr & Dunham
ATTORNEYS July 14, 1936.  R. F. LEFTWICH  2,047,375
METHOD AND MEANS OF DISPOSAL OF REFUSE
Filed May 17, 1932    8 Sheets-Sheet 7

INVENTOR
Robert F. Leftwich
BY
Cooper, Kerr & Dunham
ATTORNEYS

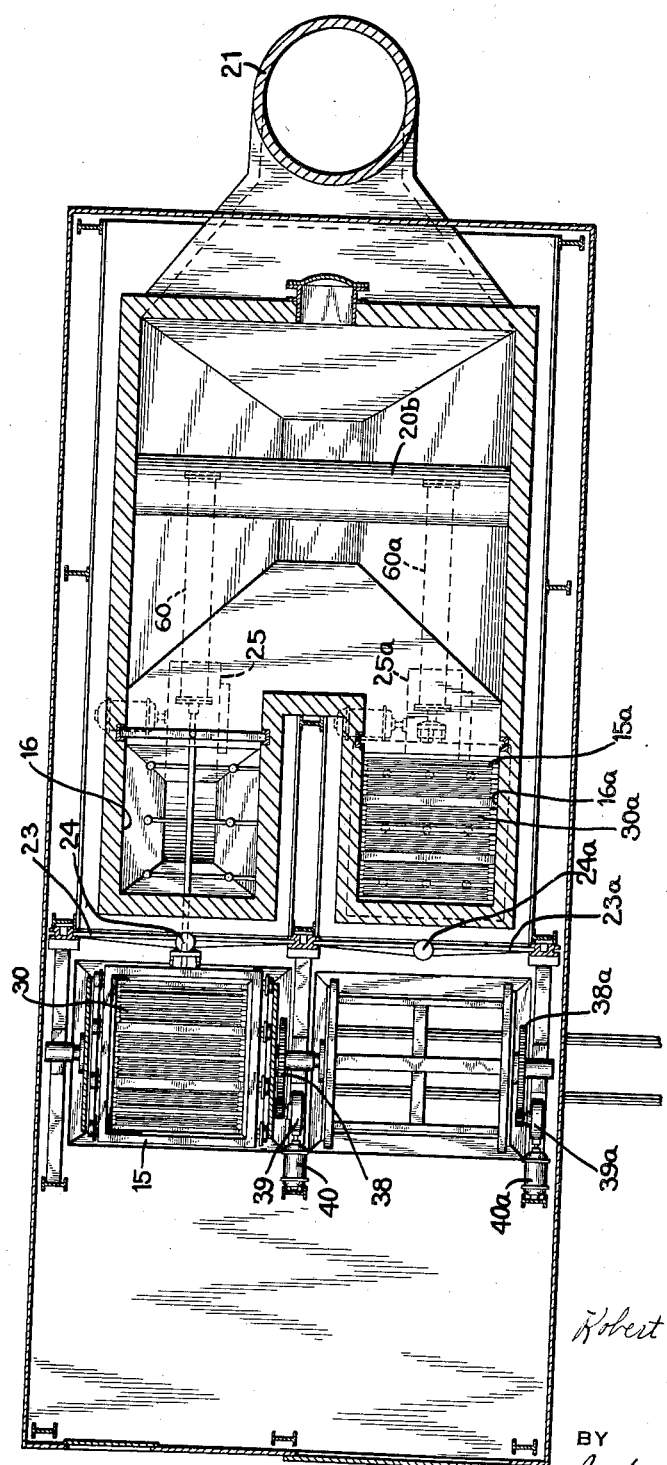

Patented July 14, 1936

2,047,375

UNITED STATES PATENT OFFICE 2,047,375

METHOD AND MEANS OF DISPOSAL OF REFUSE

Robert F. Leftwich, Bronxville, N. Y., assignor to Greenawalt Incinerating Corporation, New York, N. Y., a corporation of New York Application May 17, 1932, Serial No. 611,848

4 Claims. (Cl. 110—8)

This invention relates to improvements in plants and methods of refuse disposal.

In large cities, at the present time, the disposal of refuse presents a difficult problem. The refuse which must be disposed of is of all sorts and sizes and includes rubbish, ashes and garbage. Efforts are made in present disposal plants to separately dispose of these materials, but difficulty is always experienced in the collection of the refuse in separated condition. Due to this difficulty of obtaining the constituents properly separated from one another, the problem of refuse disposal is made very difficult.

Accordingly the present invention has for its objects the provision of a novel refuse disposal plant which will enable refuse to be disposed of and the bulk thereof reduced to a sanitary clinker-like form without requiring the materials to be separately collected and delivered to the plant.

Another object of the present invention resides in the provision of a refuse disposal plant and method which will enable continuous burning operations to be carried out to the general end that increased capacity may be secured for a given unit of a plant and further to the general end that obnoxious gases may be destroyed and a sanitary non-bulky residue produced.

Further and other objects of the present invention will be hereinafter set forth in the accompanying specification and claims and shown in the drawings which by way of illustration show what I now consider to be a preferred embodiment of my invention.

In the drawings:

Fig. 4 is an enlarged detail view of certain parts shown in smaller scale in Fig. 1 showing a car in incinerating position and showing the mechanism for dumping the car when it is withdrawn from the furnace;

Fig. 5 is a sectional view taken substantially on line 5—5 of Figs. 4 and 6 and looking in the direction of the arrows. This view also shows by dashed lines, the position which a car would assume in the dumping mechanism prior to reversal and dumping of the car;

Figure 19:
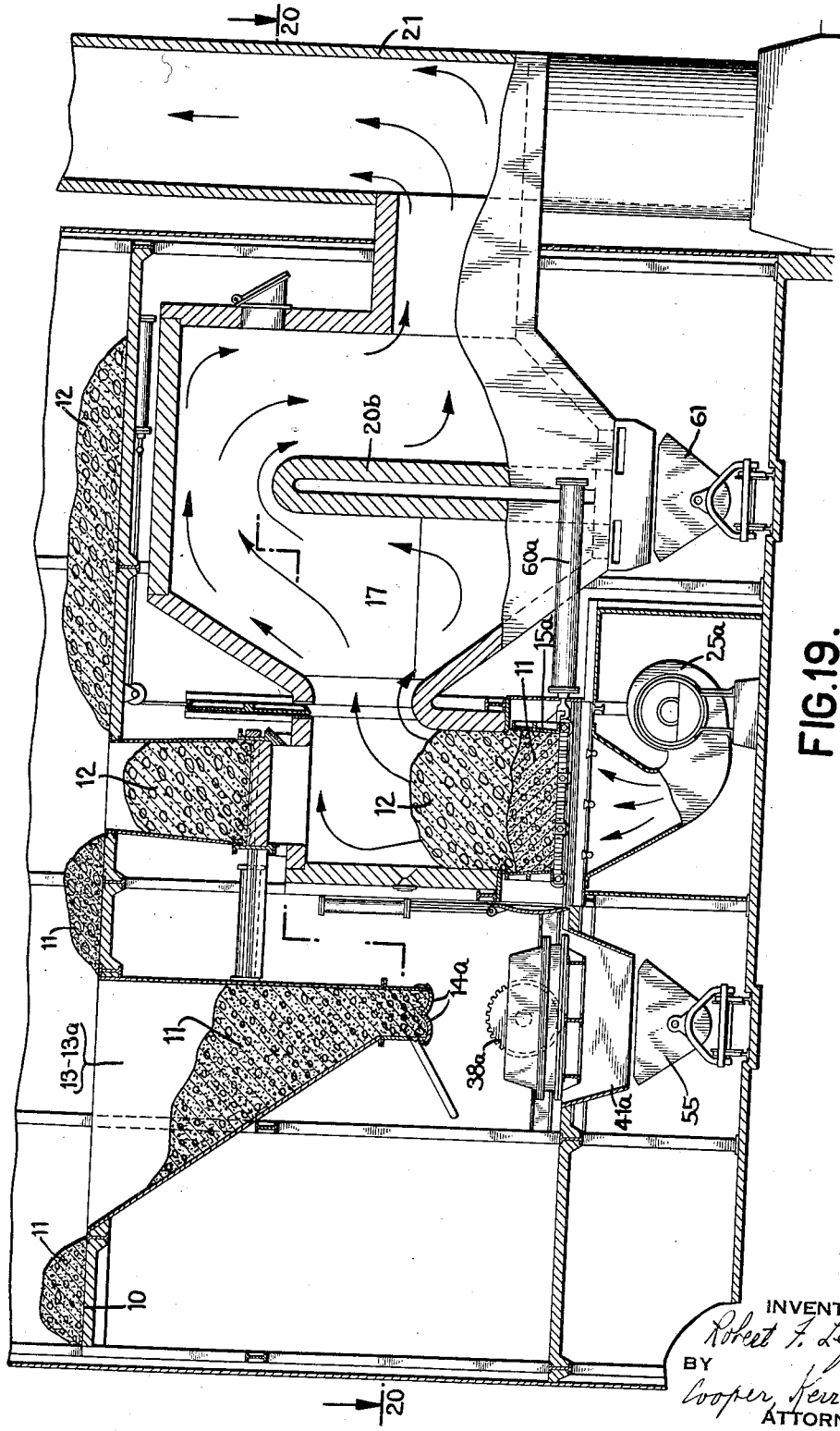

Figs. 7 to 18 inclusive, are diagrammatic views showing the sequence of steps of various operations of the plant;

Fig. 19 is a sectional view of a modified construction of incinerator; and

Fig. 20 is a transverse horizontal sectional view of the modified form, the section being taken on line 19—19 of Fig. 19.

It may be explained that by classifying the refuse in this manner that the constituents of the refuse which have relatively greatest fuel value will be largely concentrated in the middling sized material. By the removal of the fines, both the middling sized material and the oversize material are in a better condition for subsequent burning. The fines, if present in the material, would tend to impede burning by diminishing the porosity of the mass. By wholly removing these fines, the middling size material in particular, when in a mass, is quite porous and is admirably adaptable for ready ignition and for rapid burning at a high temperature so that such material can be utilized for effecting the burning of the less readily ignited oversize material.

When the refuse is brought into the plant it is first classified and screened into oversize material, middling material and fines. Suitable screening arrangements can be provided to have the oversized material pass over a 1½" screen, the middling material to pass over a ¼" screen and the fine material to pass through a ¼" screen. The fine material is taken directly to an aggregate plant or is otherwise directly disposed of.

Figure 1:
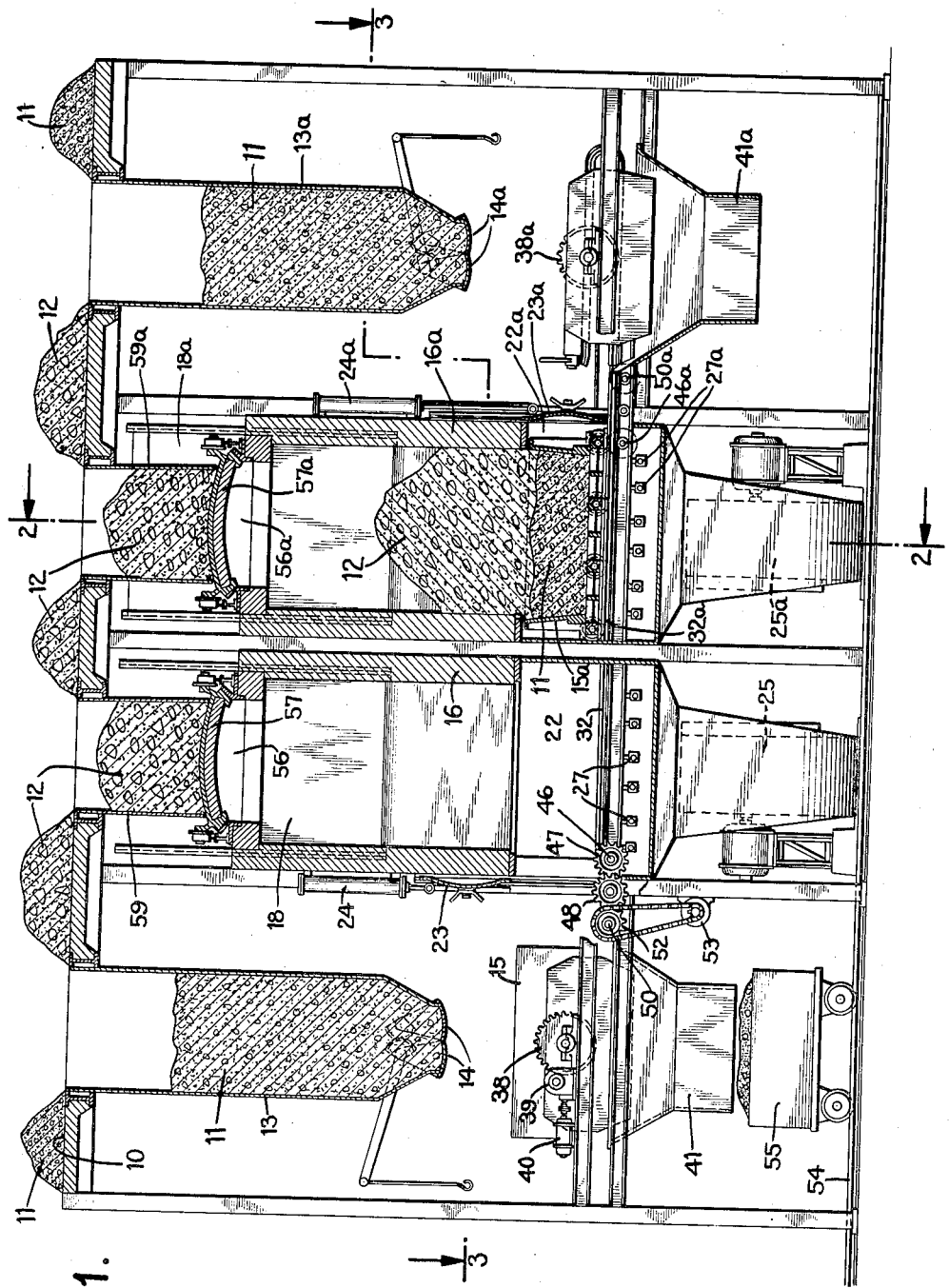
Figure 1 is a vertical transverse sectional view of the incinerating plant. The section is taken on line 1—1 of Fig. 2.

After the refuse material has been thus screened and classified, the middling material and the oversize material are preferably placed in separate piles on the charging floor, which charging floor is designated 10 in Fig. 1. In this figure, the reference character 11 represents a pile of middling sized material, the reference characters 12 represent piles of oversize material. From the charging floor 10 the middling material 11 is loaded into two hoppers respectively designated 13 and 13a on Fig. 1. Such hoppers are provided with suitable gate bottoms 14 and 14a. With the middling material in the hoppers, the first operation is to charge one of the grate cars 15. The grate car 15 is placed under the hopper 13 and is then charged with middling material. (See also Fig. 7 which indicates this step of the operation.)

In the operation of the incinerating or refuse disposal plant, it is desirable to provide for continuous operation of the various incinerating units. A multiplicity of such units may be provided in any plant. For this purpose each incinerating unit is made with two fire box chambers respectively designated 16 and 16a in Fig. 1 and both of these fire box chambers of the single incinerating unit are arranged to discharge their gases of combustion into a single combustion chamber generally designated 17 in Figs. 2 and 3. Selective inter-communication is afforded between the fire box chamber 16 and/or 16a and the common combustion chamber 17 by means of two individually operated dampers 18 and 18a (see Figs. 1 and 2). The dampers are adapted to be operated in any suitable manner, as by separate hydraulic cylinders, one of which is shown at 19a in Fig. 2. From the common combustion chamber 17 the gases of combustion pass by a baffle wall 20 and finally are directed to a stack 21. Below the fire chambers 16 and 16a are wind box chambers 22 and 22a (see Fig. 1). Suitable gates 23 and 23a are provided for these wind box chambers, such gates being operable in any desired manner as by hydraulic cylinders 24 and 24a. Air for blast purposes is supplied to the wind boxes in any desired manner as by independent fans 25 and 25a, which fans discharge into the wind boxes, independent dampers 26 and 26a being provided intermediate the fans and the wind boxes (see Fig. 2). Disposed adjacent the bottom of the wind boxes 22 and 22a are suitable igniting devices such as oil or gas burners designated 27 and 27a. For the purpose of supplying air for secondary combustion in the combustion chamber 17, passages such as 28a (Fig. 2) may be provided, such passages being controlled by dampers 29a, (see also Fig. 3, which shows the passages 28a).

For each of the fire box chambers 16 and 16a there is provided a corresponding grate car 15 and 15a. Each of these grate cars can be moved into a burning position under the fire chamber or can be displaced to a charging and dumping position outside of the wind box. In Fig. 1, 15 represents a car in charging position under the hopper 13. In this figure, 15a represents a car in burning position in wind box 22a beneath the fire chamber 16a. Each charging car 15 and 15a is provided with a suitable grate bottom 30 and 30a.

Inasmuch as the grate cars are of identical construction, one of these cars with its associated mechanism will be described and it will be understood that the other car is of like construction and that similar reference numerals will apply to it.

The suffix a will be used with the parts associated with the grate car 15a and simple reference numerals without the suffix a will represent parts associated with the other grate car. Grate car 15a in addition to being provided with the grate bottom 30a is provided with a number of supporting wheels indicated at 31a. As shown, four sets of wheels are provided on each side of the grate car but any number may be provided as desired. The wheels 31a support the grate car upon suitable tracks 32a. These tracks extend into the wind box and also extend slightly outside thereof as indicated in Fig. 1. Extension tracks 33a are provided in alignment with tracks 32a and such extension tracks are looped back as indicated at 34a. The arrangement of the extension tracks 33a and 34a is such that the wheels of a grate car fit between the upper and lower tracks when the car is advanced over the extension tracks. The extension track structures 33a and 34a are carried on a suitable supporting structure (see Fig. 5), including side plate members 35a. Trunnion shafts 36a (see Fig. 5) are suitably secured to the plates 35a and such trunnion shafts are suitably mounted in fixed bearings 37a. One of the trunnion shafts 36a has secured to it a ring gear 38a, which ring gear through a pinion and worm reduction gear drive generally designates 39a (Fig. 4) is adapted to be rotated by a motor 40a. It will be understood that upon current being supplied to the motor 40a that the supplementary track assemblage will be rotated to reverse position from that shown so that the car will be turned upside down and the contents dumped into a discharge hopper 41a (Fig. 4).

Figure 6:
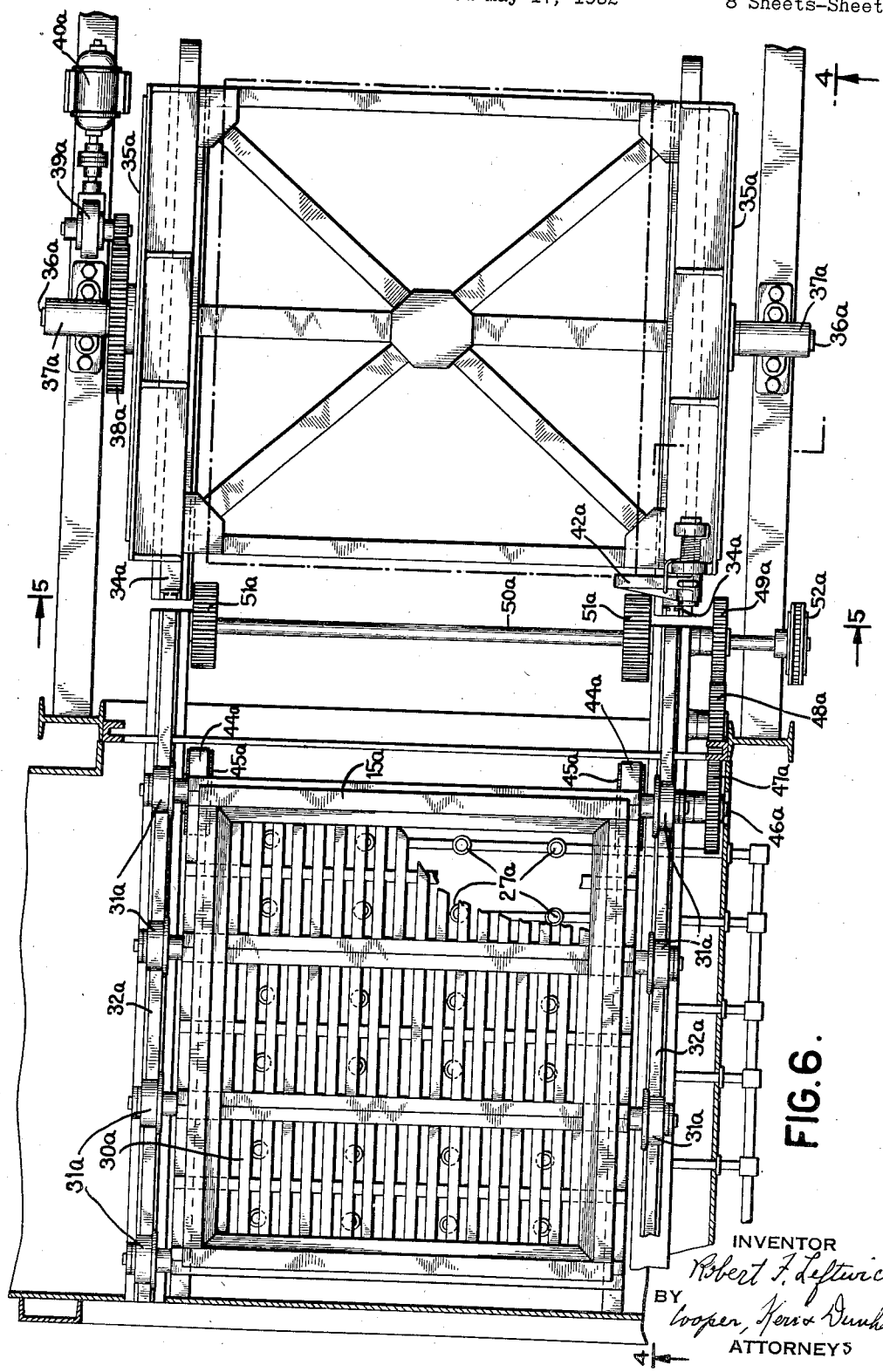
Fig. 6 is a horizontal transverse sectional view of the parts shown in Fig. 4. The section is taken substantially on line 6—6 of Fig. 4.

While the car is in position in the extension tracks, it is maintained in such position in any suitable manner as by a manually operated latch device 42a, (Figs. 5 and 6). Before removal of a car from the supplementary tracks, the latch will be retracted by manual manipulation of the handle 42a and such retraction is also made to permit a car to enter the supplementary tracks. In order to transfer the car to the fire chamber or to the supplementary tracks certain transfer mechanism is provided.

According to the embodiment of the invention shown in Figs. 1 to 6, such transfer mechanism includes downwardly facing racks 44a secured to the bottom of the grate car 15a. With a car under the fire chambers 16a such racks mesh with gear 45a which are fixed upon a cross-shaft 46a. Shaft 46a extends beyond one of the gears 45a and upon such end is provided a spur gear 47a, which through an intermediate gear 48a (Fig. 6) meshes with the gear 49a disposed on a shaft 50a, provided with gears 51a similar to gears 45a and having an equal pitch diameter. The shaft 50a is also provided with a suitable sprocket 52a (see Figs. 1 and 6), which sprocket is driven by a chain drive from a motor 53 (Fig. 1).

By rotating the above described arrangement of shafts in one direction by means of the motor 53, it will be understood that a car can be displaced from a position within the wind box to a position without the wind box, or it can be displaced back from the position without the wind box in the supplementary tracks to a position within the wind box. The supplementary track structure can be generally termed the "grate car dumping mechanism" and it will be understood that a car can be positioned in this dumping mechanism in upright position to receive a charge, or it can be reversed to discharge the clinker from the car through hopper 41a. Suitable clinker cars can be provided running on a track 54. One of such clinker cars is indicated at 55 (Fig. 1) in a position below the dumping hopper 41.

Figure 2:
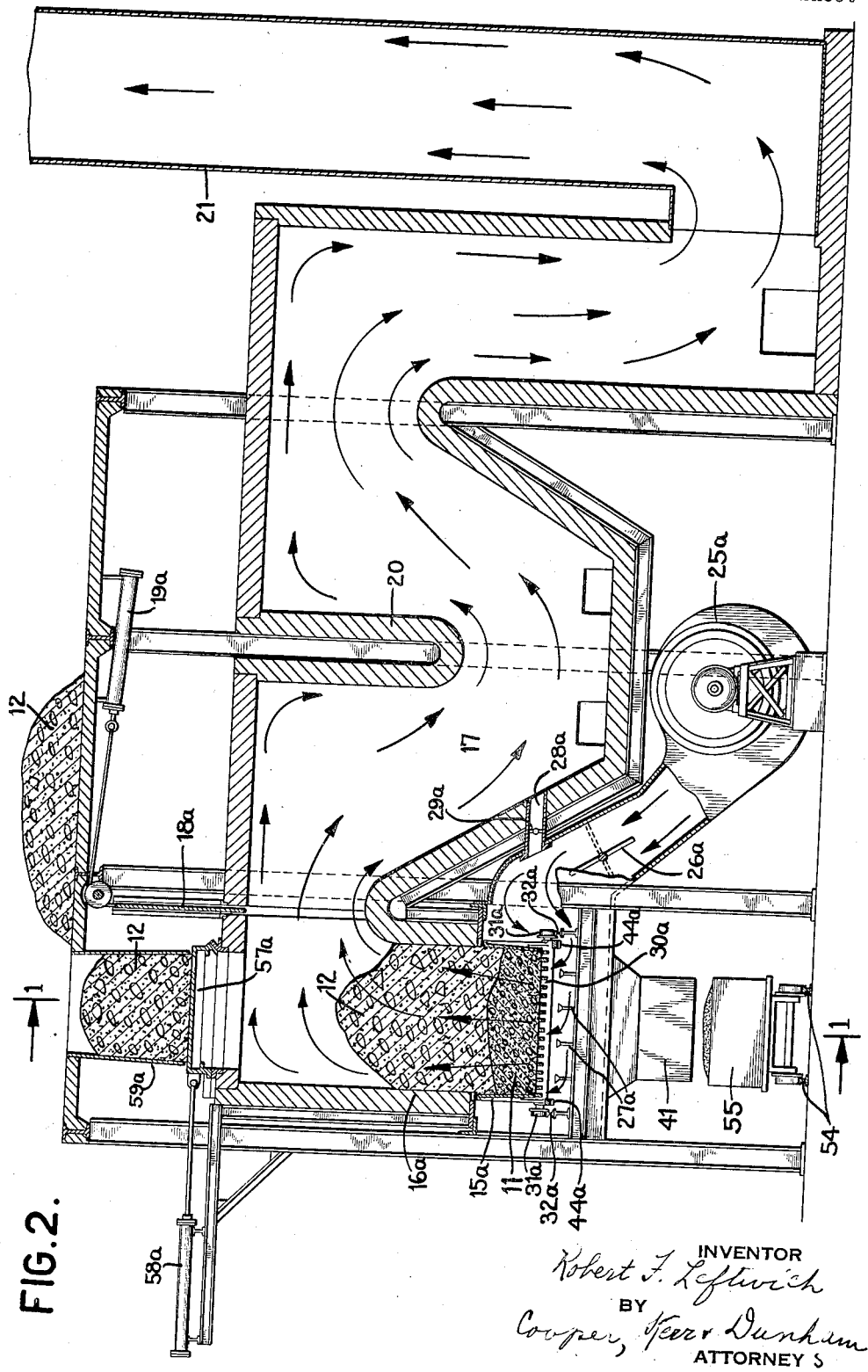
Fig. 2 is a detail sectional view taken substantially on line 2—2 of Fig. 1, which view shows the common combustion chamber and the connections to the stack, etc.
Figure 3:
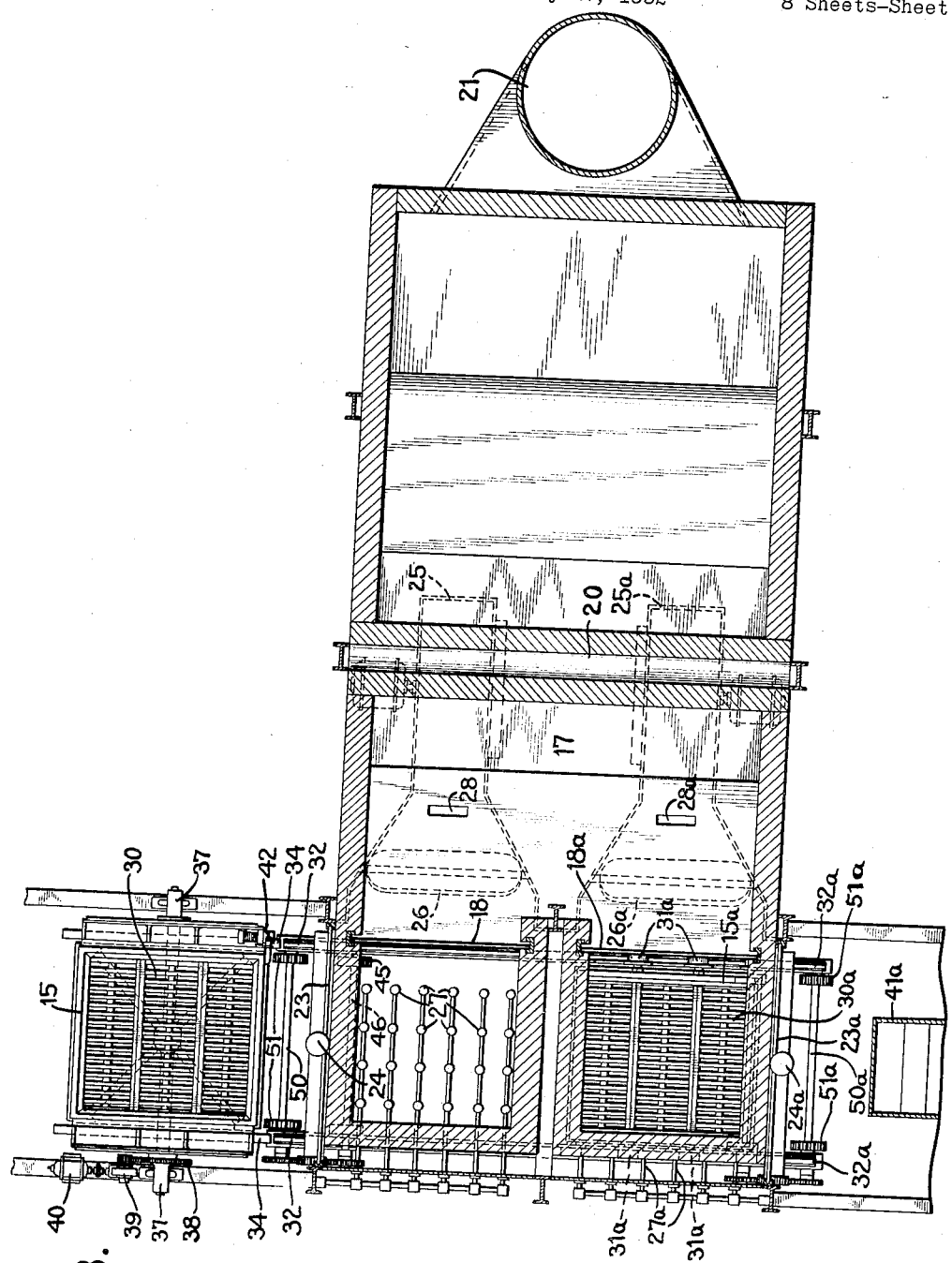
Fig. 3 is a transverse horizontal sectional view, the section being taken substantially on line 3—3 of Fig. 1 and looking in the direction of the arrows.

Provision is made for charging oversize material into either of the fire chambers 16 or 16a from the charging floor 10. Suitable charging openings are provided in the top of the fire chambers as indicated at 56 and 56a (Fig. 1). Displaceable gates 57 and 57a are provided for closing these charging openings. Gates 57 and 57a can be opened and closed in any desired manner as by means of separate hydraulic cylinders, one of which, viz. 58a, is indicated in Fig. 2, adapted to operate gate 57a. Gates 57 and 57a when closed, serve to close off the associated fire chambers 16 and 16a and also serve to provide a bottom for the oversize charging hoppers 59 and 59a, which charging hoppers receive the oversize material 12 from the charging floor 10.

The operation of the embodiment of the plant thus far described and the new method of refuse disposal, will now be more fully described with the diagrammatic views, Figs. 7 to 18 inclusive. In Fig. 7 the grate car 15 is shown in charging position. When in this position it receives a charge of middling sized material from the hopper 13 (Fig. 1). At the time when grate car 15 is receiving a charge the other grate car 15a of the incinerating unit is in position within the wind box and below the fire chamber 16a and the damper or gate 23a is in closed position as shown and the contents of such car are burning. The damper 18a is in the open position as shown and indicated in Fig. 7, to establish communication between the fire chamber 16a and the common combustion chamber 17. Damper 18, on the other hand, is in closed position to prevent cold air passing into the combustion chamber due to the open condition of gate 23.

The next step in the operation is to displace the grate car 15 from the Fig. 7 position to the Fig. 8 position within the wind box 22. After the grate car is in such position, gate 23 is shifted to closed position as indicated. Damper 18 is shifted to open position as indicated. The middling sized material within the grate car is then ignited from below the grate bars by means of the burners as indicated in Fig. 8. Ignition having been completed, the contents of this particular grate car are ready for the next step in the process.

During the following step, oversize material is charged into the fire chamber 16 as indicated in Fig. 9. This oversize material becomes lodged upon the top of the charge of burning middlings in the grate car. Charging is accomplished by opening charging gate 57.

The next step is indicated in Fig. 10. In Fig. 10 the charging gate 57 is shown moved back to closed position, the damper 18 is left in open position and a draft is applied below the grate car 15. This draft is applied until the oversize material is substantially consumed and the middling sized material substantially reduced in volume. The final condition is indicated in Fig. 16.

The next step, so far as grate car 15 is concerned, is to close damper 18, open gate 23 and withdraw the grate car with its charge of clinkered residue to the position indicated in Fig. 17.

The subsequent step is to reverse the position of the grate car and dump the contents as indicated in Fig. 18. The grate car 15 is now righted and is ready for a new cycle of operations again following through the cycle commencing as shown in Fig. 7.

Now referring to grate car 15a, it will be noted that grate car 15a is in the wind box and is burning its charge of oversize and middlings while the grate car 15 is in charging position. It is also maintained in such burning position in the steps of operation shown in Figs. 8, 9 and 10. In Fig. 10 it will be noted that the contents of both grate cars 15 and 15a are being burned and that the oversize material is also being burned. After the step shown in Fig. 10 has been carried out and the oversize and middling material have been reduced by burning or to a suitable residue and bulk for discharging, the draft through 15a is discontinued. The gate 23a is then raised as indicated in Fig. 11. The grate car 15a is withdrawn and prior to the withdrawal of the grate car the damper 18a is displaced to closed position. The grate car 15a is then dumped and discharged as indicated in Fig. 12. It is now ready to receive a new charge of middlings as indicated in Fig. 13 and then it follows in the steps previously traced for the car 15.

By the above cycle of operations it will be appreciated that the maximum time in the cycle can be afforded for burning operations. The time of burning will of course depend upon conditions encountered in practice. By the above arrangement of incinerating unit and steps of procedure provision is afforded for effecting burning in one grate car when another grate car is being charged, dumped or ignited. In this way operation time is saved and the incinerating capacity of a given plant unit is greatly increased. The operation is substantially a continuous one. Continuous burning provides for maintained high temperatures and complete burning of obnoxious gases.

Figs. 19 and 20 show a slightly modified embodiment of plant. In this embodiment of incinerating unit the fire chambers are disposed side by side as before (see Fig. 20). In place of removing the grate cars to the sides of the unit as in the previous embodiment, the grate cars are removed for charging to the front of the unit, i. e. to the left in Figs. 19 and 20. This disposition of the parts of the unit permits the utilizing of hydraulic cylinders 60 and 60a for displacing the grate cars 15 and 15a to and from charging and dumping position and burning position. In other respects the general mode of operation is the same as for the plant unit previously described. Further, according to the embodiment shown in Figs. 19 and 20, the baffle 20b extends vertically upward from the bottom instead of being a dependent baffle as is the case with the embodiment shown in Fig. 2. With the embodiment of the plant shown in Fig. 19 a supplementary ash car 61 may be provided receiving fine ashes from the bottom of the combustion chamber.

With the embodiment shown in Figs. 19 and 20 the middling piles 11 on the charging floor 10, are located in a centralized position in place of being in separated points as with the other embodiment. Furthermore, with the embodiment shown in Fig. 19, a common hopper designated 13—13a is provided for the middlings for charging both grate cars and separate gates 14 and 14a can be provided leading from this common hopper to separately dump the middlings into the separate grate cars.

What I claim is:

1. A refuse incinerating furnace provided with a fire chamber and a combustion chamber, a charging and clinker discharging station without the furnace chamber, a displaceable grate car and means supporting the same to provide for the alternative disposition of the grate car within the furnace in the fire chamber for the burning of refuse and without the chamber adjacent the aforesaid station for discharging clinker therefrom and for loading the car with refuse, means within the fire chamber for igniting the refuse in the grate car from below the grate thereof when the grate car is within the fire chamber, a wind box to enclose the grate car and provide for the forcing of air therethrough, and means providing for the charging of additional refuse upon the burning refuse in the grate car.

2. A refuse incinerating furnace with a common combustion chamber, and a pair of fire chambers disposed to discharge products of combustion thereinto and including in combination a pair of grate cars each displaceable to a position without the furnace for discharging clinker and charging each car, means for charging each car when without the furnace, passages between the fire chambers and the common combustion chamber, means to close the passage between either fire chamber and the common combustion chamber, means providing a wind box about each car when the same is in place below the fire chamber, means for igniting a charge of refuse in either of said grate cars from below the grate thereof, and means for charging additional refuse upon the burning refuse in each grate car.

3. A refuse disposal plant comprising an incinerating furnace, including a fire chamber and means for charging large sized refuse thereinto, a loading and discharging station without the fire chamber, a shiftable grate car, and means supporting the car to provide for the disposition of the car below the fire chamber when the contents of the car are to be burned to clinker form, and providing for the shifting of the car to another position away from the fire chamber and adjacent the aforesaid station for discharging and loading the car, means for igniting the refuse within the car from below the charge therein, means for directing a blast of air through the car to burn the contents thereof to clinker form and to also burn the larger sized refuse charged into the fire chamber to clinker form with reduced bulk so that all of the clinker may be withdrawn by the withdrawal of the grate car.

4. A refuse disposal plant comprising a refuse burning unit including a common combustion chamber and a pair of fire chambers discharging products of combustion thereinto, a charging and a discharging station without the fire chamber, a pair of grate cars each having an air pervious floor and each disposed for independent removal from association with one fire chamber to a point adjacent the aforesaid station while the other car is maintained in cooperation with the other fire chamber, means for igniting the contents of a grate car by flame directed through the pervious bottom thereof, means for burning the material in the grate car by an air blast directed upward through the pervious bottom and through the charge in the car above said bottom, means for charging and discharging one car while the contents of the other car is burning in the fire chamber, whereby a continuous burning of refuse in the unit may be maintained by providing for burning in one car when the other car is being discharged and charged.

ROBERT F. LEFTWICH.